Feb. 9, 1926.

H. J. MEAD 1,572,301

LINING FOR TRANSMISSION AND BRAKE BANDS

Filed Dec. 4, 1924

Inventor
Harry J. Mead

Patented Feb. 9, 1926.

1,572,301

UNITED STATES PATENT OFFICE.

HARRY J. MEAD, OF PHILADELPHIA, PENNSYLVANIA.

LINING FOR TRANSMISSION AND BRAKE BANDS.

Application filed December 4, 1924. Serial No. 753,786.

*To all whom it may concern:*

Be it known that I, HARRY J. MEAD, a citizen of the United States, and resident of Philadelphia, in the county of Philadelphia and State of Pennsylvania, have invented a certain new and useful Improvement in Linings for Transmission and Brake Bands, of which the following is a full, clear, concise, and exact description, reference being had to the accompanying drawing, forming a part of this specification.

My invention relates to linings for transmission bands and brake bands. The present type of lining is applicable to the planetary transmission drums and the brake drums of automobiles, or the transmission drums or brake drums of any class of machinery where a non-chattering non-shuddering braking action is desired. The embodiment of lining illustrated in the accompanying drawing has been devised particularly for application to the planetary transmissions of automobiles, such as on the well-known Ford automobile, but, as above indicated, the utility of the lining is not limited thereto.

In this class of planetary gear transmissions, there is a tendency for the gripping of the bands on the transmission drums to produce a very objectionable vibration or "shuddering" of the car when starting and changing speed. Similarly, when gripping the propeller shaft brake drum for stopping the car, this "shuddering" of the car is very pronounced.

The fundamental object of the present invention is to provide a lining which will not chatter or cause shuddering of the car, and which will still present a large braking area of maximum effectiveness.

A further object is to increase the wearing qualities of the lining and its ability to absorb and retain lubricant. This is attained by shrinking the outerweave of the lining, as I shall presently describe.

Figure 1:
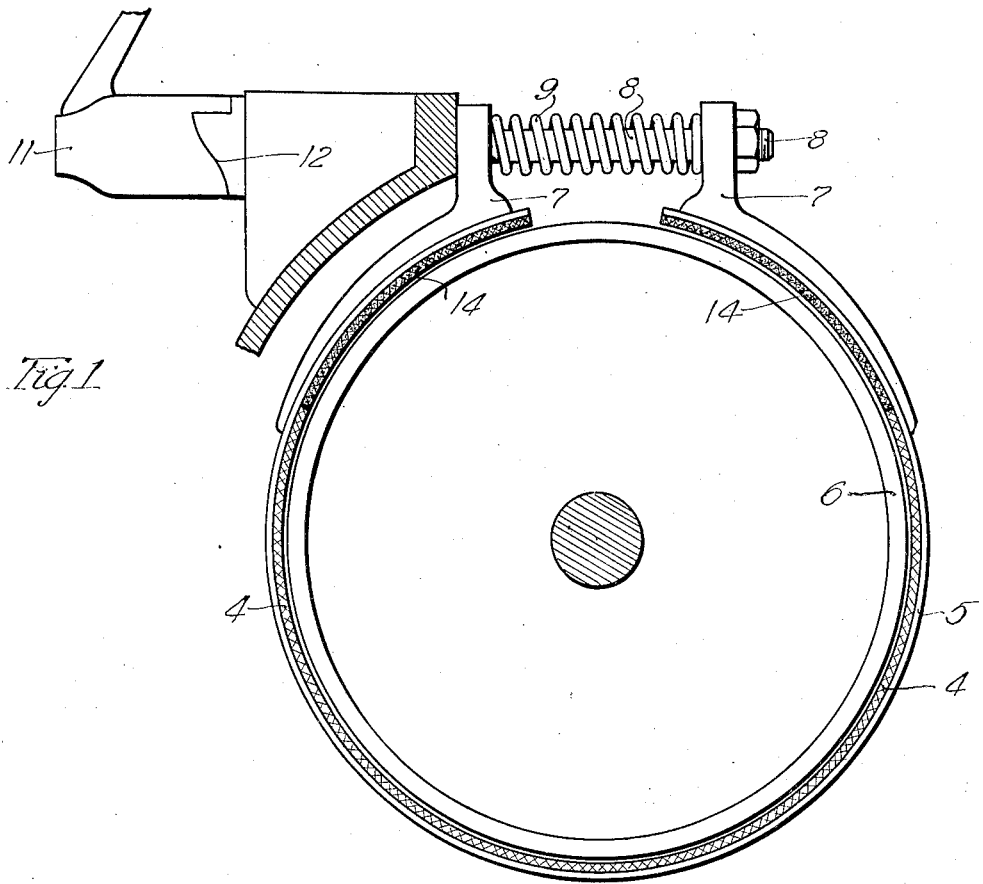
Figure 2:
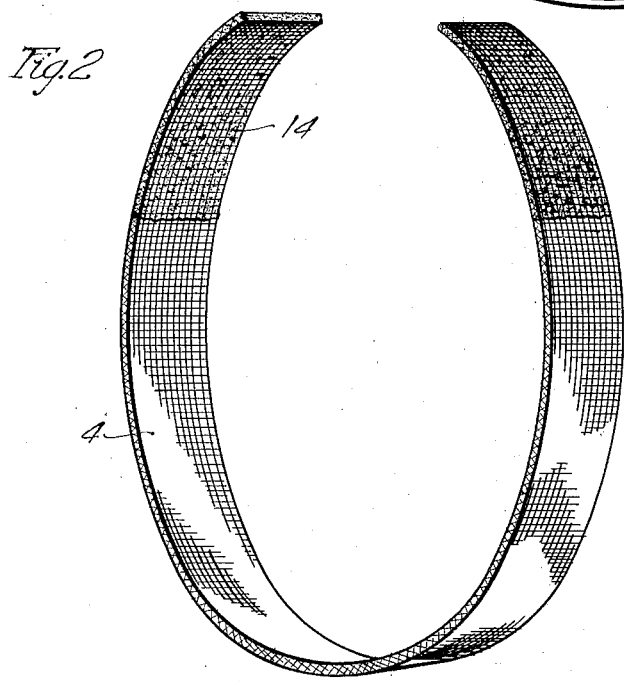

In the accompanying drawing illustrating my improved lining:

Figure 1 is a side elevational view of a brake band to which my improved lining has been applied, mounted on a planetary transmission drum; and Figure 2 is a perspective view of one of the linings.

In Figure 1 the present lining 4 is shown secured in a brake band 5. These linings are generally attached to their bands by rivets, as is well known in the art. The band 5 is shown as embracing a rotating drum 6, which is representative either of a transmission drum or a propeller shaft brake drum (well known in the typical Ford construction). The lugs 7 secured to the ends of the band 5 are apertured for receiving a transverse operating shaft 8, through the actuation of which the band is contracted upon the drum 6. The spring 9, interposed between the lugs 7 around the shaft 8, restores the band to non-gripping position after release of the transmission or brake pedal. The manner of operating these bands through pedal hubs 11 having wedge surfaces 12, is well known to those skilled in the art.

The lining is of a good grade of textile woven in belt form from which the required lengths are cut. One of the first steps in the process of preparing the present lining, which step is preferably but not necessarily performed before cutting to length, is that of shrinking the outer weave of the lining.

The lining is passed through a common water dye which is kept boiling, and from this bath the lining is passed through a wringer or other squeezing rolls. This process of passing the lining through the water dye and then through the wringer back into the water dye is continued as a rapid, continuous cycle until the outside weave of the lining has absorbed all of the dye that it will hold. The color of the outside weave indicates when the latter has been thoroughly shrunk. The wringer squeezes the water out of the lining before it can soak thoroughly into the interior of the lining and as a result the inside body of the lining does not shrink with the outer weave, or shrinks to a lesser degree than the outer weave. The close texture thereby given the outer weave gives greater durability to the braking surface and adds considerably to the life of the brake band. The inside texture of the lining acts as an oil wick or absorbent filling for absorbing the oil which is splashed up over the bands by the fly-wheel. The oil thus absorbed keeps the lining soft and pliable and minimizes the tendency of the lining to burn or glaze, such as generally occurs from lack of oil.

The next step in the preparation of the lining is to treat each end thereof with a graphite solution to the end of eliminating all chattering or shuddering. I have found that the desired results can be obtained by treating about four inches of each end, these treated ends being indicated at 14 in Figures 1 and 2.

In arriving at the best manner of applying this graphite, and the most efficient solution to obtain the desired distribution and proper quantity of graphite, I have developed the following compound:

To 100 parts of thick starch add between 35 and 50 parts of gelatine that has been allowed to boil and cool into a thick mass. To this mixture add 35% of flake graphite (medium fine grade) by weight. Stir the compound until the graphite is well mixed therein.

This compound is applied to the lining when cold, and forms a relatively permanent, stable lubricant on the end of the lining having a shelf life equal to that of the lining itself, and otherwise complying with the requirements of commercial distribution and sale. The above described compound may be sold for application to the ends of linings by the dealer or user.

The undesirable chattering and shuddering caused by prior transmission bands and brake bands results from one end of the band tending to snub or seize to the rotating drum, which results in this end of the band being drawn with the rotating drum for a short distance, when the band lets go and snaps back to its former position, where it again snubs or seizes the drum. This is rapidly repeated, and sets up a chattering or shuddering in the band and in the rotating drum.

The present graphite treatment of the ends of the lining prevents these ends from snubbing or seizing to the rotating drum and thus obviates this chattering or shuddering at its very source. The relatively low coefficient of friction of these lubricated ends allows them to slip before they will cause chattering. While the ends of the lining are thus prevented from snubbing or seizing to the drum, nevertheless the major portion of the band intermediate these treated ends remains at the highest braking efficiency for applying the desired braking retardation to the drum. This naturally follows from the normal or higher coefficient of friction of the intermediate portion. Thus, the chattering or shuddering caused by the brake band is eliminated at its source without materially decreasing the braking efficiency of the band. The effectiveness of the graphite thus applied will remain for substantially the life of the lining.

Where the lining is to be used on a transmission drum rotating in only one direction, it will be obvious that only one end thereof may be treated.

I claim:

1. A lining for transmission or brake bands having one end treated with graphite, and with the portion thereof intermediate its ends untreated to serve as a braking surface.

2. A lining for transmission or brake bands having the ends treated with graphite, and with the intermediate portion untreated to serve as a braking surface.

3. A lining for transmission or brake bands having the ends treated with a relatively permanent lubricant to prevent seizing and with the intermediate portion of said band remaining untreated for giving the necessary braking surface.

4. A compound for treating the ends of transmission or brake linings composed of starch, gelatine and graphite.

5. A compound for treating the ends of transmission or brake bands composed of starch, gelatine and flake graphite in substantially the proportions described.

6. A lining for transmission or brake bands having its outer weave shrunk.

7. A lining for transmission or brake bands characterized by an outer weave of relatively close texture produced by shrinking.

8. A lining for transmission or brake bands characterized by an outside weave of close texture produced by shrinking, the ends of said lining being treated by graphite.

In witness whereof, I hereunto subscribe my name this 24th day of November, 1924.

HARRY J. MEAD.